United States Patent [19]

Wickman

[11] 4,285,431

[45] Aug. 25, 1981

[54] INFLATABLE BLADE BAG

[75] Inventor: David L. Wickman, Stamford, Conn.

[73] Assignee: The United States of America as represented by the Secretary of the Navy, Washington, D.C.

[21] Appl. No.: 146,855

[22] Filed: May 5, 1980

[51] Int. Cl.³ .............................................. B65D 81/14
[52] U.S. Cl. .................................................... 206/522
[58] Field of Search .................... 206/522; 53/403, 433

[56] References Cited

U.S. PATENT DOCUMENTS

| 1,827,322 | 10/1931 | Linderman | 206/522 |
|---|---|---|---|
| 2,444,859 | 7/1948 | Sturtevant | 206/522 |
| 4,190,158 | 2/1980 | Ambrose | 206/522 |
| 4,240,556 | 12/1980 | Field | 206/522 |

FOREIGN PATENT DOCUMENTS 1141991 3/1957 France ....................................... 206/522

Primary Examiner—Herbert F. Ross
Attorney, Agent, or Firm—Richard S. Sciascia; Arthur A. McGill

[57] ABSTRACT

A double layer inflatable bag for protecting a blade of an aircraft. The bag includes a puncture proof outer layer and a flexible inner layer joined together at the extreme ends to form an elongated bag. Means for inflating various sections of the space in between two layers are provided. The bag is put on over the blade and is inflated. Inner layer of the bag is in contact with the blade to keep it in position and the outer layer thereof protects the blade from damage.

9 Claims, 8 Drawing Figures

U.S. Patent  Aug. 25, 1981  4,285,431
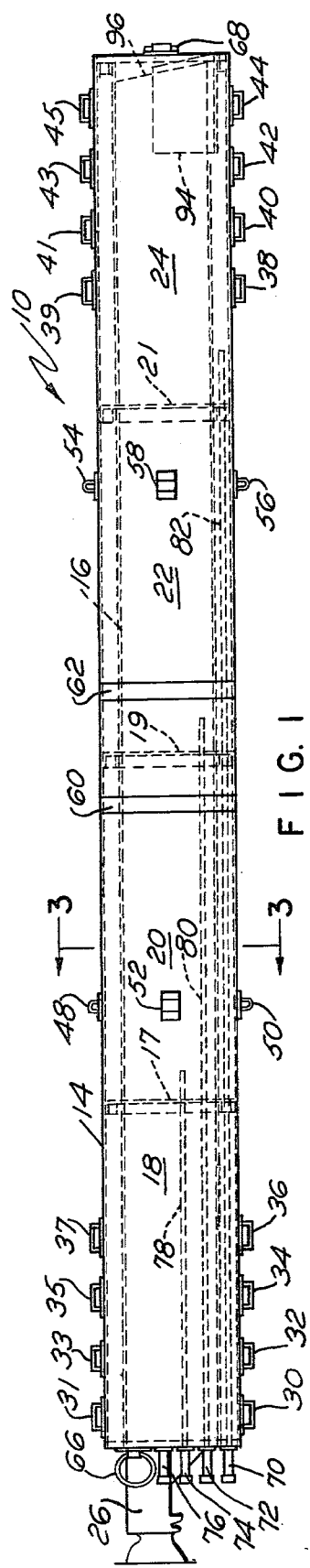
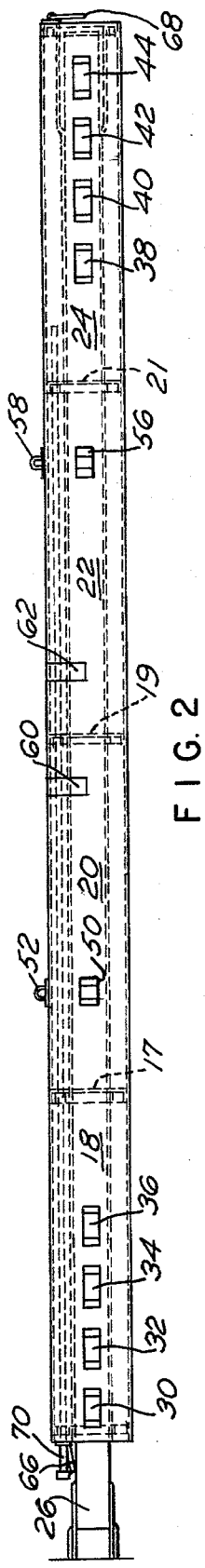
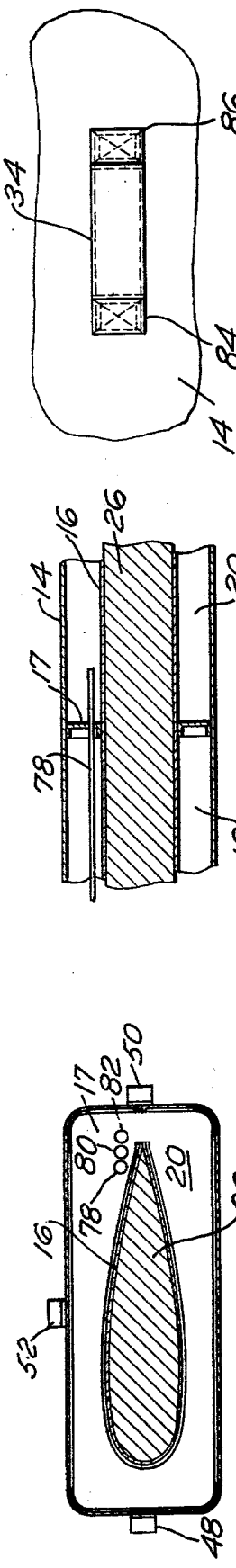
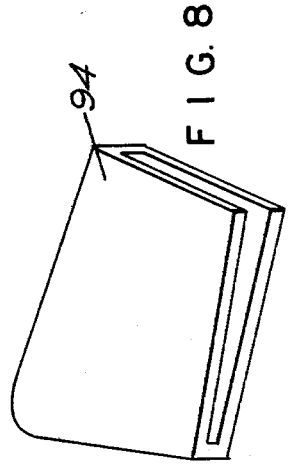
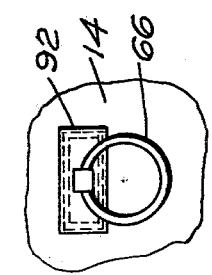
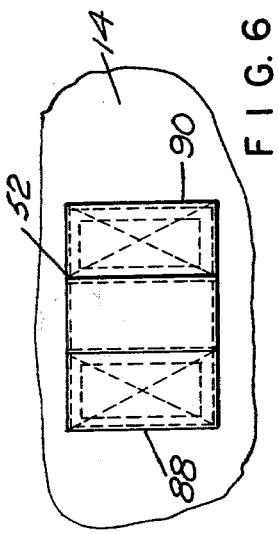

INFLATABLE BLADE BAG

STATEMENT OF GOVERNMENT INTEREST

The invention described herein may be manufactured and used by or for the government of the United States of America for governmental purposes without the payment of royalties thereon or therefor.

BACKGROUND OF THE INVENTION

The present invention generally relates to protective means for blades of an aircraft and more particularly to an inflatable double layer bag for protecting the blade of an aircraft.

The blades of a propeller of an aircraft are usually quite long and thin with sharp end points. It is difficult to package such articles for mounting, shipping and storing purposes. Furthermore, these blades are quite cumbersome to manipulate for maintaining a predetermined angular position and alignment for balancing purposes. The storage and shipping of these blades is quite hazardous to the blades as well as to the people handling such objects. Besides, such blades must be assembled in sets of packages for storage and shipment after a carefully matched set for a given rotor installation has been assembled, with each blade packaged in its own individual container. It is thus desirable to have a protective cover for blades which can be used for storage and shipping purposes without doing any damage thereto and to improve the handling thereof.

SUMMARY OF THE INVENTION

A protective cover for a rotor blade of an aircraft built according to the teachings of subject invention includes a double layer bag having a puncture proof outer layer and a relatively flexible inner layer. The outer and inner layers are joined together so as to form an airtight space therebetween which can be inflated by using inlet means. The air bag is divided into a plurality of sections and each section can be inflated or deflated independently. The air bag can be slipped over the rotor blade by using rings at the ends thereof. After covering the rotor blade with the air bag, air or some other suitable gas is used to inflate the various sections of the bag. The inner layer of the bag conforms to the dimensions of the blade. The inflated air bag enclosing the rotor blade prevents the motion of the blade and its outer layer protects the blade from exterior objects during alignment procedures as well as transporting and/or storing. The air bag is provided with a plurality of handles and hoist hooks for handling the enclosed blade.

An object of subject invention is to have an inflatable bag which acts as a protective shield for the blade of an aircraft.

Another object of subject invention is to have an inflatable air bag which will prevent the motion of the blade inside the air bag.

Still another object of subject invention is to have an inflatable air bag which has a puncture-resistant outer layer so as to protect the blade inside the air bag from damage during transporting or storing.

Still another object of subject invention is to have an inflatable air bag which improves the handling of the protected blade.

Other objects, advantages and novel features of the invention will become apparent from the following detailed description of the drawings when considered in conjunction with the accompanied drawings wherein:

BRIEF DESCRIPTION OF THE DRAWINGS

FIG. 1 is a top view of an inflatable air bag built according to the teachings of subject invention with a rotor blade housed therein;

FIG. 2 is a side view of the inflatable air bag of FIG. 1;

FIG. 3 is a cross-section of FIG. 1 taken along line 3—3;

FIG. 4 is a section of air bag of FIG. 1 to show a partition between two sections thereof;

FIG. 5 shows the position of one of the handles attached to the air bag of FIG. 1;

FIG. 6 shows one of the hoist hooks attached to the air bag;

FIG. 7 shows one of the rings attached to one end of the air bag for maneuvering the bag over the blade; and FIG. 8 is a schematic representation of one of the boots to be used over the ends of an enclosed rotor blade.

DESCRIPTION OF THE PREFERRED EMBODIMENT

Referring to the drawings, FIG. 1 shows a top view of the protective inflatable air bag 10 built according to the teachings of subject invention. A generally elongated bag 10 includes outer layer 14 and inner layer 16 sealed airtight together at the extreme ends with a provision to inflate the space in between as will be described below. The outer layer 14 is generally made of a puncture-proof material such as rubberized canvas or the like and inner layer 16 is made of a flexible material such as canvas. Bag 10 is divided into airtight sections 18, 20, 22 and 24 separated by partitions 17, 19 and 21 respectively. As shown in FIGS. 1 and 2, blade 26 is housed inside bag 10 with its root end at one end of the bag. Bag 10 is provided with handles 30–37 and 38–45 so as to facilitate the handling of the blade 26 when it is enclosed in bag 10. Hoist hooks 48, 50 and 52 and 54, 56 and 58 are also provided to manipulate the blade by means of a crane when the blade is inside the bag. Balancing stripes 60 and 62 are provided for balancing purposes in order to manipulate the bag 10 enclosing blade 26. Rings 66 and 68 are provided on the outer ends of air bag 10 in order to slip it over the rotor blade 26. Inlet valves 70, 72, 74 and 76 are provided for inflating sections 18, 20, 22 and 24 respectively by using inner tubes 78, 80 and 82 as shown in FIG. 1. FIG. 2 is a side view of air bag 10 enclosing blade 26. FIG. 3 is a cross-sectional view of the blade enclosed in air bag 10 taken along line 3—3. FIG. 4 is a section of the air bag showing a partition 17 between sections 18 and 20 and inner tube 78 used for inflating section 20 of the air bag. FIG. 5 shows handle 34 sewed by stitches 84 and 86 on the outer layer or member 14 of the air bag 10. FIG. 6 shows hoist hook 52 sewed to the outer layer or member 14 of air bag 10 by seams 88 and 90. FIG. 7 shows ring 66 attached by seam 92 to the outer layer of 14. Rings 66 and 68 facilitate the covering of rotor blade by air bag 10 before inflating it. FIG. 8 shows a boot 94 which is preferably made of rubber in order to cover end 96 of rotor blade 26 as shown by dotted lines in FIG. 1.

In operation, the inflatable air bag 10 is slipped over rotor blade 26 by using rings 66 and 68 after boot 94 is put on end 96 of blade 26. The bag near the root end of blade 26 is made so as to make an air tight connection between blade 26 and the air bag 10. Air or some other suitable gas is used to inflate the various sections of the air bag using inlet means or valve connections 70, 72, 74 and 76 and inner tubes 78, 80 and 82. The space between outer layer or member 14 and inner layer or member 16 is filled with gas at pressure so as to make the inner layer or member 16 conform to the contour of the blade. The puncture-proof outer layer or member 14 protects the blade from the damage by outside objects hitting the blade during aligning, storing or transporting. The air bag in its inflated position can be handled by using handles 30–37 and 38–45. The blade can be manipulated by means of hoist hooks 48, 50, 52 and 54, 56 and 58 respectively. Stripes 60 and 62 marked on air bag 10 near the center thereto are used for balancing purposes for effective manipulation of the air bag enclosing the rotor blade. When the air bag is not used, it is deflated by means of tubes 78, 80 and 82 and their corresponding valve connections and can be rolled into a small configuration for storing purposes. Novel feature of such a bag covering the rotor blade aircraft is the fact that the inner layer 16 of air bag 10 when inflated conforms to the contours of the blade. This prevents movement of the enclosed rotor blade inside the air bag. Furthermore, the outside layer being relatively puncture-proof, the air or some other suitable gas under pressure in between layers 14 and 16 provides enough resistance to an external object damaging the blade enclosed in the air bag. Furthermore, the various sections of the air bag are independently inflatable or deflatable so as to preserve the integrity of the sections which are not deflated due to leaking of air or gas. The handles and the hoist hooks are used in manipulating the rotor blade once it is enclosed by the inflated air bag.

Briefly stated, a protective cover in the form of an inflatable air bag for a rotor blade of an aircraft includes a flexible inner layer and a puncture-proof outer layer together at the end points to form an elongated air bag. The air bag is divided into a plurality of sections which can be inflated or deflated independently by means of inlets and corresponding air hoses. The air bag is provided with a plurality of handles and hoist hooks for manipulating the rotor blade when enclosed in the air bag and the air bag is in its inflated position.

Obviously, many modifications and variations of the present invention may become apparent in the light of the above teachings. As an example, the number of independently inflatable sections in which the air bag can be divided can be varied without deviating from the teachings of subject invention. Furthermore, the size of the air bag can be varied to accommodate blades of different sizes. Besides, material of which the inner and outer layers of the bag are made of can also be varied.

It is therefore understood that within the scope of the appended claims the invention may be practiced otherwise than as specifically described.

I claim:

1. An inflatable blade bag for protecting the rotor blade of an aircraft during alignment, transportation and storage thereof, which comprises:
    a generally elongated, double-layer bag having an inner layer and an outer layer enclosing an airtight space therebetween;
    means for mounting and demounting said double layer bag in deflated position thereof over the rotor blade;
    means for inflating and deflating said double layer bag by adjusting the pressure of a gas inside said airtight space enclosed by the inner layer and outer layer of said double layer bag;
    means for carrying manually said double-layer bag in inflated position thereof and enclosing the rotor blade; and
    means for manipulating said double-layer bag when inflated and enclosing the rotor blade for alignment purposes.

2. The inflatable double-layer bag of claim 1 wherein the airtight space enclosed by the inner layer and outer layer is divided into a plurality of independently inflatable and deflatable airtight sections.

3. The inflatable double layer bag of claim 2 wherein means for mounting and demounting said double-layer bag in deflated position thereof includes at least a pair of rings secured to the outer layer of said double-layer bag.

4. The inflatable double-layer bag of claim 2 wherein said means for inflating and deflating said plurality of independently inflatable and deflatable airtight sections includes a valve and an inner tube for each member thereof.

5. The inflatable double-layer bag of claim 1 wherein said means for carrying manually in inflated position thereof and enclosing the rotor blade includes a plurality of handles.

6. The inflatable double-layer bag of claim 1 wherein said means for manipulating thereof when inflated and enclosing the rotor blade includes a plurality of hoist hooks.

7. The inflatable double-layer bag of claim 1 which further includes balancing stripes marked on outer layer thereof for easy manipulation thereof.

8. The inflatable double-layer bag of claim 1 wherein the outer layer thereof is puncture-proof.

9. The inflatable double-layer bag of claim 8 wherein the inner layer thereof is flexible to conform to the contour of said rotor enclosed in the inflated double-layer bag.

* * * * *